INVENTOR.
W. GEORGE McCLEAN
BY
Robert L. Lindgren
ATTORNEY

April 16, 1968   W. G. McCLEAN   3,378,427
APPARATUS FOR WINDING ARTICLES
Filed June 26, 1964   2 Sheets-Sheet 2

INVENTOR.
W. George McClean
BY Robert L. Lindgren
ATTORNEY 3,378,427
APPARATUS FOR WINDING ARTICLES
William George McClean, Milwaukee, Wis., assignor, by mesne assignments, to A. O. Smith Corporation, Milwaukee, Wis., a corporation of New York
Filed June 26, 1964, Ser. No. 378,305
5 Claims. (Cl. 156—431)

ABSTRACT OF THE DISCLOSURE

The invention relates to a filament winding apparatus and particularly to a delivery mechanism for guiding a strand of fibrous material onto a rotating mandrel and for impregnating the strand with a binder. The delivery mechanism includes an annular member spaced outward of the mandrel and having a radially extending passage which defines a reservoir adapted to contain the liquid binder. A series of circumferentially spaced strands are passed through the reservoir thereby coating the strands with the binder prior to being wound on the mandrel.

---

This invention relates to an apparatus for winding articles, and more particularly to an apparatus for winding fiber reinforced plastic articles, such as pipe.

Fiber reinforced plastic articles such as vessels and pipe are normally fabricated by winding strands of resin coated fibers about a mandrel in a generally helical pattern. In fabricating smaller lengths of pipe, a machine is frequently used in which the mandrel is rotated and the fibrous strand is carried by a winding head which reciprocates along the length of the mandrel and guides the strand onto the mandrel in a generally helical pattern. After the desired number of layers have been wound on the mandrel to provide the desired wall thickness for the pipe, the mandrel is removed from the winding machine and replaced by a second mandrel. The winding is then repeated on the second mandrel to provide a second pipe length.

In the conventional processes of fabricating reinforced plastic articles it is difficult to obtain proper wetting or impregnation of the fibers or filaments with the resin. The strand which is wound on the mandrel is generally composed of a large number of fiber ends and each end includes 204 filaments. Thus, because of the great number of filaments in the strand, it is difficult to coat each individual filament with the resin and this is particularly true of the filaments located in the interior of the strand. Theoretically, each filament should be coated with the resin or other binding material in order to obtain the optimum mechanical properties. However, in practice, proper wetting is difficult to achieve and this results in a loss of mechanical properties.

The present invention is directed to a filament winding apparatus and more particularly to a delivery mechanism for coating a fibrous strand with resin and winding the strand onto the rotating mandrel to form the tubular article. The apparatus includes a winding head which is mounted for reciprocating movement along the length of the mandrel and supports a creel containing a plurality of packages or spools of the fibrous material. The strands from the various packages are guided onto the mandrel by a guide ring which surrounds the mandrel and is movable with the winding head. In addition to the guide ring, a hollow annular delivery member is located between the guide ring and the mandrel and the delivery member defines an annular resin reservoir. The strands pass through the delivery member into contact with the resin contained within the reservoir so that the individual strands are coated or impregnated with the resin.

To aid in obtaining proper wetting of the filaments in the strand, the delivery member is provided with a series of internal ridges, and the strand is worked over the ridges as it passes through the delivery member, thereby increasing the impregnation of the filaments in the strand.

The creel, guide ring and annular delivery member are all connected to the winding head and move in a reciprocating path along the length of the mandrel to guide the strand onto the mandrel in a generally helical pattern. The strands are taken off of the various packages mounted on the creel and pass in spaced relation through the guide ring, then through the delivery member where they are coated with resin, and onto the mandrel.

The apparatus of the invention improves the wetting or impregnation of the various filaments of the fibrous strand. In the apparatus of the invention, the strand is pulled through the resin mass and is also worked over the ridges to thereby insure that the resin will impregnate the internal portion of the strand to coat the filaments therein.

As the strands from the various packages all enter the circumferential slot in the delivery member in a common plane, more uniform tension on the strands is achieved with the result that more uniform impregnation or wetting occurs. This structure provides a marked improvement over a device in which the strands enter a resin bath from various angles and in this latter case the tension on the strand will vary with the result that uniform impregnation of the strands cannot be achieved.

The combination of the guide ring, which accurately spaces the individual strands, and the annular delivery member provides a good orientation of fibers with proper and equal spacing so that the fibers, when wound on the mandrel, will lie in side-by-side relation without voids or gaps between the strands.

As the delivery member is spaced only a slight distance radially outward from the mandrel, waste at the end of the stroke is held to a minimum. For example, when the winding head reaches the end of the mandrel it will reverse its path of travel and return in the opposite direction, and this results in a build-up of fiber material at the end points of the winding pattern. By maintaining the delivery member as close as possible to the mandrel, this build-up at the ends of the pattern is minimized which thereby reduces the waste which has to be cut or severed from the ends of the pipe.

The apparatus of the invention has an additional advantage in that a smaller amount of resin can be used, which results in a longer pot life. The amount of resin mass determines the pot life. Assuming a given temperature, the greater the mass of resin, the shorter the pot life. With the system of the invention, only a small amount of resin is used which results in a longer pot life and correspondingly a smaller amount of resin waste at the end of each day's operation.

Other objects and advantages will appear in the course of the following description.

The drawings illustrate the best mode presently contemplated of carrying out the invention.

Figure 1:
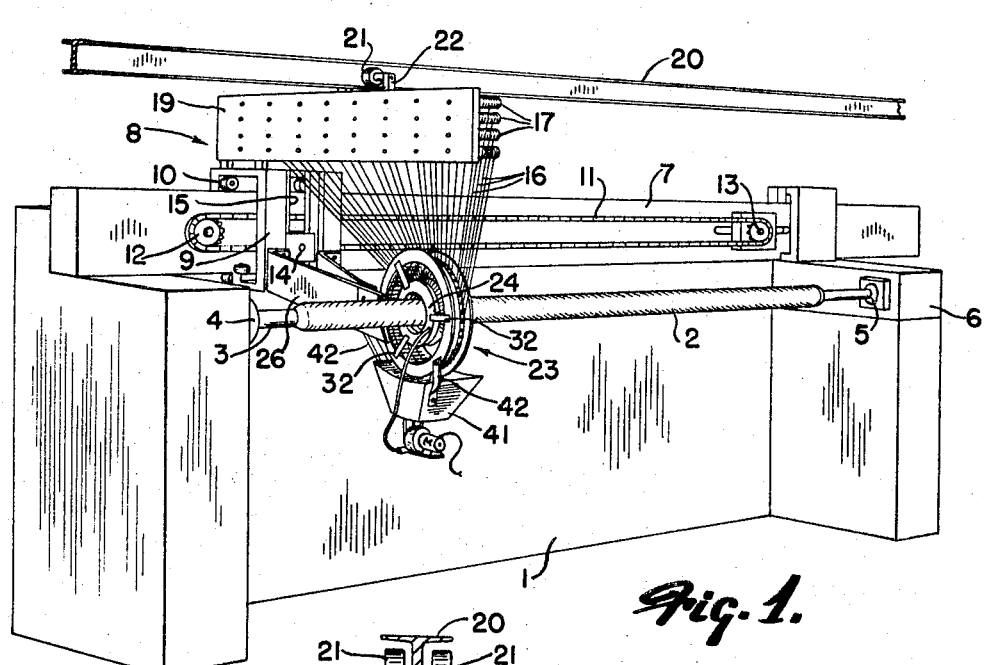
FIGURE 1 is a perspective view of the winding apparatus of the invention.
Figure 2:
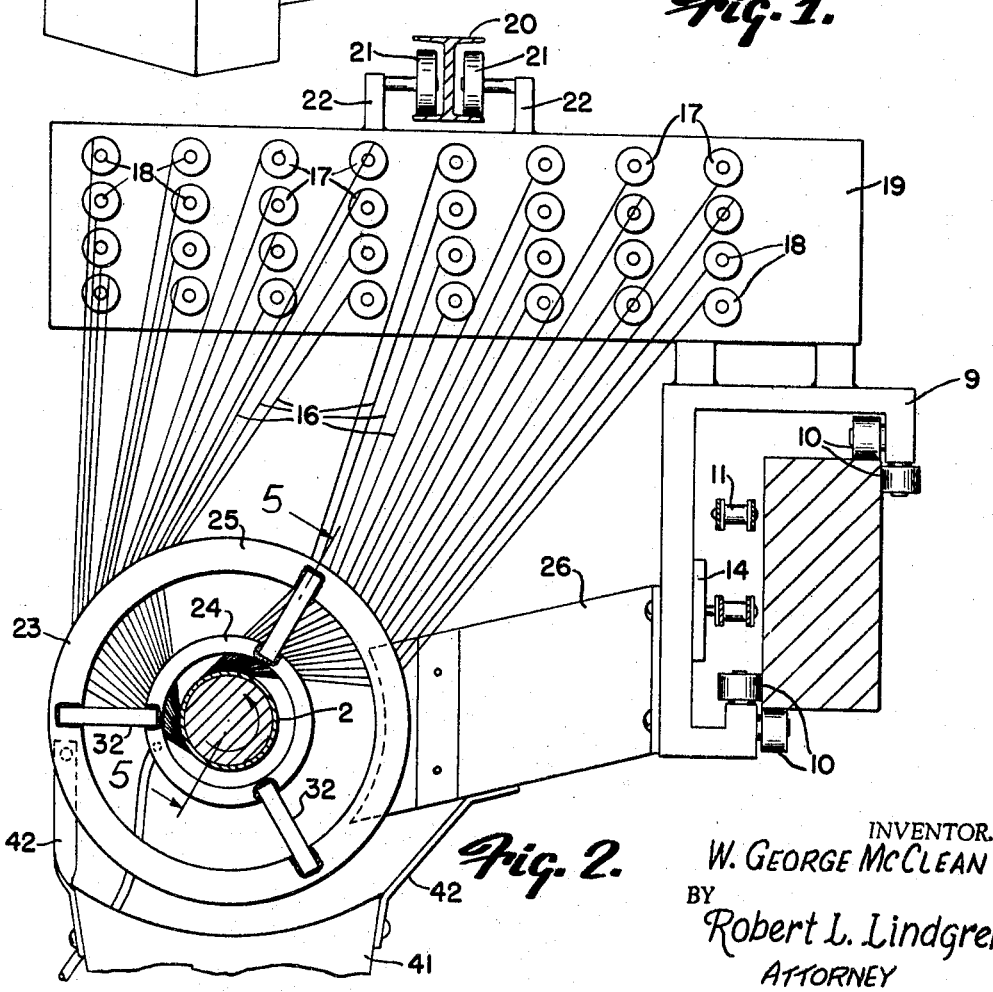
FIG. 2 is an enlarged fragmentary transverse section showing the winding head and the mandrel.
Figure 3:
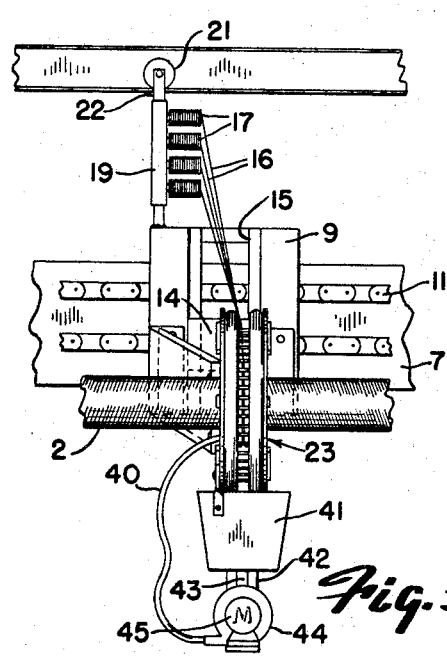
FIG. 3 is an enalrged fragmentary side elevation showing the winding head and the mandrel.

The drawings illustrate an apparatus for winding a fiber reinforced tubular article, such as a pipe, tube, vessel or the like. The apparatus includes a casing or cabinet 1 and a mandrel 2 is secured to a shaft 3 which is supported by the casing 1. The mandrel 2 is rotated about its axis by a drive spindle 4 which is connected to one end of the shaft 3 while the opposite end of the shaft 3 is connected to a spindle 5 which is mounted on a movable tailstock 6.

A horizontal beam 7 is mounted on the casing 1 and extends generally parallel to the mandrel 2 and the beam 7 supports a winding head 8 which is adapted to reciprocate along the length of the mandrel 2 and wind a fibrous strand onto the mandrel to form the tubular article.

The winding head 8 includes a movable carriage 9 which is provided with a series of rollers 10 which ride along the beam 7. The carriage is driven in a reciprocating path by a drive chain 11 which is trained over a drive sprocket 12 and an adjustable idler sprocket 13. Drive sprocket 12 and the drive spindle 4 are driven by a conventional drive mechanism located within the casing 1.

The endless drive chain 11 is rotatably connected to a slide 14 which is mounted for sliding movement in a vertical guideway 15 formed in the carriage 9. With this construction, the carriage 9 will move along the mandrel with movement of the drive chain 11, and when the chain passes around the sprockets the slide 14 will move vertically within the guideway 15 to permit the carriage to follow the chain in its reverse path of travel.

According to the invention, a series of fibrous strands 16 are adapted to be wound on the rotating mandrel 2 in a series of superimposed layers to provide the pipe or other tubular article. The strands 16 are contained in coiled or wound form on a series of packages 17. Each package 17 of the fibrous material is supported on a generally horizontal shaft 18 which is journalled on a vertical creel or support plate 19. The inner end of the creel 19 is connected to the carriage 9 so that the creel and packages 17 will move in accordance with reciprocating movement of the carriage 9.

Due to its weight, the creel 19 is supported in reciprocating movement from a beam or rail 20. A pair of rollers 21 are journalled on brackets 22 which extend upwardly from creel 19, and the rollers 21 are adapted to ride along the rail 20 as the winding head 8 reciprocates along the length of the mandrel.

The strands 16 which are taken off of the wound packages 17 are passed through an annular guide member 23 and an annular delivery member 24 and then wound on the mandrel 2.

The guide member 23 includes a pair of spaced rings 25 which are supported from the carriage 9 by a pair of arms 26 so that the guide member 23 will move with the carriage 9. An annular tube 27 is welded or brazed to the inner surface of each of the rings 25 and the tubes 27 are spaced apart and the strands 16 being taken from the packages 17 pass within the gap or space between the tubes 27. The tubes 27, having a generally circular cross section, provide a smooth or curved radius over which the strands pass. The strands leaving the guide member 23 are all in a common plane which is disposed generally normal to the axis of the mandrel 2. However, the strands entering or approaching the guide member 23 may not all be in a common plane, depending on the location of the packages 17 and thereby the tubes 27 provide a curved radius on which the strands can ride in entering the guide member 23.

Figure 4:
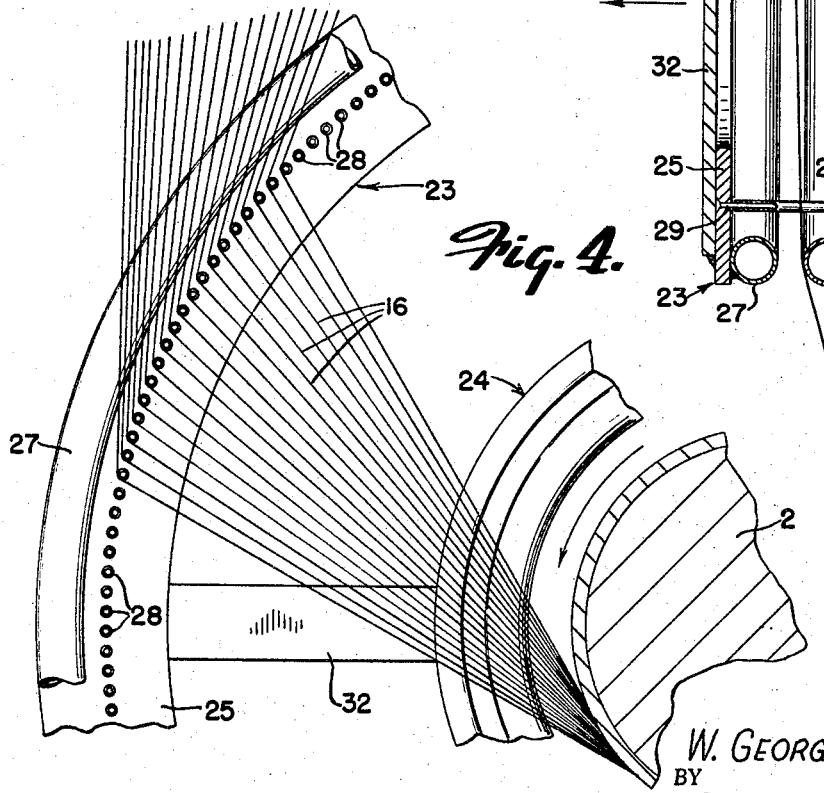
FIG. 4 is an enlarged fragmentary transverse section showing the details of the guide ring and delivery member.

The individual strands 16 are uniformly spaced by a series of generally cylindrical guide sleeves or rollers 28 which are rotatably mounted on pins 29 extending between the rings 25. As best shown in FIG. 4, the guide rollers 28 are located in circumferentially spaced relation and extend completely around the circumference of the rings 25. Each fibrous strand 16 is adapted to ride over a guide roller 28 and the rollers thus provide proper spacing of the strands which are traveling to the delivery member 24. For clarity, the strands 16 are shown as extending over only a portion of the circumference of the annular guide member 23. However, it is contemplated that the strands can extend over the entire circumference of the annular guide member 23 or any sector of the circumference of the guide member, depending on the number of strands employed.

The strands 16 are preferably of fibrous material and can be in the form of substantially continuous unidirectional fibers, woven fabric, braided tubing, matting or the like. The fibrous material can be mineral fibers such as glass or asbestos; vegetable fibers such as cotton; animal fibers such as wool; synthetic fibers such as nylon, rayon or Dacron; or in some cases, metal fibers such as steel wire, can be used.

In the case of unidirectional glass fibers, the strand 16 will generally be composed of a number of fiber ends with each end containing 204 filaments. To obtain the optimum physical properties in the wound article, each individual filament in the strand should be coated with the resin or other binding material. In commercial practice, it has been difficult to completely coat or impregnate all of the individual filaments of the strand, and particularly those filaments which are located on the interior of the strand. According to the invention, the wetting or impregnation of the filaments within the fibrous strand is improved by passing the strands 16 through the delivery member 24 which contains a reservoir of resin or other binder prior to winding the strands on the mandrel.

The delivery member 24 comprises two halves or rings 30 and 31 which are disposed concentrically of the mandrel and spaced a slight distance outwardly from the mandrel. The halves 30 and 31 are supported from the rings 25 of the guide member 23 by a series of radially extending arms 32 which are welded to the rings 25 and the halves 30 and 31.

The halves 30 and 31 are spaced apart to permit the strands 16 to pass therebetween. Half 30 is rigidly attached to arms 32, while half 31 is adjustably connected to the arms so that the spacing between the halves can be varied, depending upon the size or thickness of the strands 16.

To adjustably connect the half 31 to the arms 32, a series of screws 33 extend through openings in the arms 32 and are threaded into holes in the half 31. The arms 32 are fixed and threading of the screws 33 will move the half 31 toward and away from the half 30 to thereby vary the spacing between the members. The screws 33 are prevented from rotating by keeper springs 34 which are secured to the outer surface of the arms 32 and are adapted to engage the slits in the screw heads.

Halves 30 and 31 of the delivery member 24 are provided with rounded edges 35 at the outlet of the space or passage 36 between the members, and the strands 16 ride or travel over the rounded edges 35 as the winding head 8 and delivery member 24 reciprocate along the length of the mandrel 2.

Figure 5:
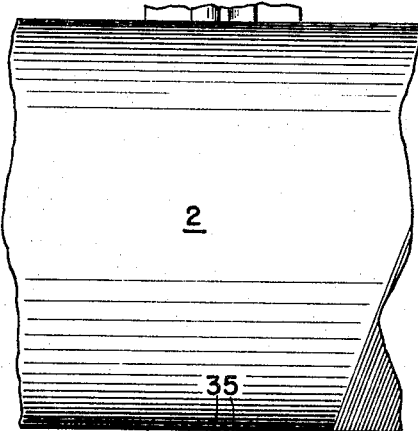
FIG. 5 is a section taken along line 5—5 of FIG. 2 and showing the guide ring and delivery member.

As best shown in FIG. 5, the section or half 30 is provided with an internal reservoir or chamber 37 which extends around the entire circumferential extent of the delivery member 24. The chamber 37 is adapted to receive a resin or other binding material which is applied to the strands 16 as the strands travel through the chamber.

The binding material may be any desired adhesive or resin conventionally used to bind the strands together to form the tubular article. Thermoplastic and thermosetting resins can be used as the binder and it has been found that glass fibers impregnated with an epoxide resin formed by the reaction of epichlorohydrin and bisphenol A, as disclosed in Patent 2,801,277, is very satisfactory material to use in the winding operation.

As the fibrous strands 16 are composed of a multiplicity of filaments, it is often difficult to properly wet or coat all the filaments in the strand. To aid in wetting the filaments, a pair of ribs 38 are provided in the half 30 and extend circumferentially around the delivery member and protrude into the reservoir 37. In addition, a circumferential rib 39 is formed on the other half 31 and projects inwardly between the ribs 38. The strands 16 passing through the chamber 37 are caused to travel in a general sinusoidal path over the ribs 38 and 39 which serves to work the resin into the filaments of the strands and thereby improves the impregnation or wetting of the individual filaments.

The drawings illustrate the delivery member 24 as being annular and resin chamber 37 extending completely around the delivery member 24. However, in some winding operations the delivery member may extend throughout only a sector of a circle, or the delivery member may be annular and chamber 37 may extend throughout only a sector of the annular delivery member.

The resin or other coating material is introduced into the chamber 37 through a supply line 40 which is connected into an opening in the half 30 and the opening communicates with the chamber 37. Excess resin, which may drip off the strands 16, is collected in a pan 41 located beneath the annular guide member 23. Pan 41 is supported from the guide member 23 and the arms 26 by a plurality of brackets 42 so that the pan will move with the winding head 8 in reciprocating movement.

The resin which is collected in the pan 41 is recirculated back to the chamber 37. The bottom of pan 41 is provided with an outlet conduit 43 which is connected to the inlet of a pump 44. The outlet of pump 44, which is driven by a motor 45, is connected to the supply line 40. The pump serves to recirculate the resin from the pan 41 back through the supply line 40, to the chamber or reservoir 37.

In operation, the fibrous strands 16 are initially fed between the guides 29 and inserted within the radially extending passage 36 in the delivery member 24. The strands are then grouped together and wrapped around the mandrel to secure the strand to the mandrel. The drive mechanism is then started which cause the mandrel to rotate and moves the winding head along the mandrel. Rotation of the mandrel draws the fibrous strands 16 from the packages 17 through the guide member 23 and delivery member 24 and winds the strands on the mandrel in a helical pattern as the winding head traverses along the length of the mandrel. When the desired number of helical layers have been wound on the mandrel, the drive mechanism is stopped and the mandrel is removed from the machine and placed in an oven and heated to a temperature sufficient to cure the resin binder. After curing of the resin, the tubular article is stripped from the mandrel by conventional procedures.

The apparatus of the invention provides improved wetting or impregnation of the filaments of the fibrous strands. Individual tensioning devices can be associated with each of the packages 17 and by proper adjustment of the tensioning devices, substantially uniform tension can be applied to all the strands 16 passing through the resin chamber so that the filaments are uniformly impregnated, thereby eliminating resin-starved areas.

As each strand 16 is under an individual amount of tension, the web of strands have a more controllable width than the conventional web or tape used in winding operations. For example, when a conventional web or tape changes direction by passing over a guide member prior to winding, portions of the web width slacken while other portions become increasingly taut so that the tension on the strands throughout the width of the web is not uniform. To minimize this variation in tension through the web width, relatively narrow webs are generally used. In contrast to this, the tension on each strand 16 of the present invention is individually controlled and is relatively uniform so that wider web widths can be used without any problem of tension variations through the web width. This permits the winding of larger diameter articles with a greater width and thus reduces the time of winding.

The combination of the annular guide member having the spaced guides 29 and the delivery member 24 serves to provide good orientation of the strands as they are applied to the mandrel. This results in a wound pattern in which the strands lay in side-by-side relation without gaps or spaces between the side edges of the strands.

By maintaining the space between the delivery member 24 and the mandrel 2 at a minimum, the fiber build-up at the ends of the reciprocating stroke of travel is minimized, and this reduces the waste or scrap to be cut from the ends of the wound article.

In the event one or more of the strands 16 is broken, the strand can be easily re-attached by merely feeding the strand between the proper spacing members 28 and then, while holding the strand taut, inserting it within the passage 36 and down onto the rotating mandrel where it will re-attach itself and be wound on the mandrel with the other strands.

While the packages 17 are shown as being mounted on a creel 19 connected to the winding head and reciprocating with the winding head, it is contemplated that the packages can be mounted on a stationary creel. Moreover, while it is preferred to rotate the mandrel 2 and reciprocate the winding head 8, it is contemplated that the winding head can be stationary and the mandrel can move axially with respect to the winding head, in which case either the mandrel or the winding head can rotate.

Various modes of carrying out the invention are contemplated as being within the scope of the following claims particularly pointing out and distinctly claiming the subject matter which is regarded as the invention.

I claim:

1. In an apparatus for winding a fiber reinforced article, a mandrel disposed to rotate about its axis, a delivery member mounted for reciprocating movement along the length of said mandrel, the inner surface of the delivery member spaced equidistant from the outer surface of the mandrel throughout the circumferential extent of said delivery member and said delivery member defining a closed chamber to contain a liquid binder, said chamber extending substantially throughout the circumferential extent of said delivery member, said delivery member having a circumferentially extending inlet slot communicating with the chamber and having a circumferentially extending outlet slot communicating with said chamber, supply means for supplying a liquid binder to said chamber, and means for passing plurality of fibrous strands through said inlet slot, through said chamber and through said outlet slot, said strands being coated with the liquid binder as they pass through the chamber and being subsequently wound on the mandrel.

2. The apparatus of claim 1, wherein said delivery member and said chamber are annular in shape.

3. The apparatus of claim 1, and including means located within the chamber for deflecting the strands out of a straight path of travel within the chamber to thereby aid in impregnating the strands with said binder.

4. The apparatus of claim 1, and including at least one ridge located within said chamber and disposed between said inlet slot and said outlet slot for deflecting the strands in a toruous path of travel within the reservoir to thereby aid in wetting the strands with said binder.

5. The apparatus of claim 4, wherein said ridge extends generally normal to the direction of travel of said strands from said inlet slot to said outlet slot.

References Cited
UNITED STATES PATENTS

| | | | |
|---|---|---|---|
| 1,810,007 | 6/1931 | Fischer | 118—420 |
| 2,714,414 | 8/1955 | DeGanahl et al. | 156—171 |
| 3,032,461 | 5/1962 | Baker et al. | 156—175 |
| 3,125,483 | 3/1964 | DeGanahl | 156—175 X |
| 3,187,494 | 6/1965 | Fuller | 57—11 X |
| 3,201,298 | 8/1965 | Baker et al. | 156—431 |

EARL M. BERGERT, *Primary Examiner.*

J. P. MELOCHE, D. J. FRITSCH, *Assistant Examiners.*